(12) United States Patent
Ishihara et al.

(10) Patent No.: US 7,101,601 B2
(45) Date of Patent: Sep. 5, 2006

(54) EXHAUST GAS PURIFYING FILTER WITH REINFORCED PERIPHERAL AREA AND METHOD FOR MANUFACTURING THE SAME

(75) Inventors: Mikio Ishihara, Kariya (JP); Mamoru Nishimura, Nagoya (JP)

(73) Assignee: Denso Corporation, (JP)

( * ) Notice: Subject to any disclaimer, the term of this patent is extended or adjusted under 35 U.S.C. 154(b) by 169 days.

(21) Appl. No.: 10/681,133

(22) Filed: Oct. 9, 2003

(65) Prior Publication Data
US 2004/0071932 A1    Apr. 15, 2004

(30) Foreign Application Priority Data
Oct. 15, 2002    (JP) .............................. 2002-300828
Sep. 8, 2003     (JP) .............................. 2003-315831

(51) Int. Cl.
  *B32B 3/12*    (2006.01)
  *B01D 50/00*   (2006.01)
(52) U.S. Cl. ...................... 428/116; 428/34.4; 428/188; 428/192; 428/194; 428/117; 422/177
(58) Field of Classification Search ................ 428/116, 428/34.4, 188, 192, 194, 117; 422/177
  See application file for complete search history.

(56) References Cited

U.S. PATENT DOCUMENTS 4,669,261 A * 6/1987 Worner et al. ............... 60/297

5,514,446 A     5/1996 Machida et al.
2002/0020944 A1  2/2002 Yamaguchi
2003/0093982 A1  5/2003 Suwabe

FOREIGN PATENT DOCUMENTS

| EP | 1 293 241 | 3/2003 |
| GB | 2 071 640 A | 9/1981 |
| JP | 56129042 | 10/1981 |
| JP | 63-12658 | 3/1988 |
| JP | 5-118211 | 5/1993 |
| JP | 7-246341 | 9/1995 |

OTHER PUBLICATIONS

French Search Report dated Sep. 29, 2005.

* cited by examiner

*Primary Examiner*—Ling Xu
(74) *Attorney, Agent, or Firm*—Nixon & Vanderhye PC

(57) ABSTRACT

An exhaust gas purifying filter having a high strength and an excellent efficiency of exhaust gas purification and a method for manufacturing the same are provided. An exhaust gas purifying filter 1 comprises a ceramic honeycomb structure 2 having a surrounding wall 21, partition walls 22 provided in a honeycomb pattern within the surrounding wall 21, and a plurality of cells 23 partitioned by the partition walls 22 and penetrating through end faces 241, 242. If a virtual line 3 is drawn on the end faces 241, 242 of the structure 2 by continuously connecting points at a distance of 1.0 to 3.0 times the cell pitch in the direction toward the center from an inner surface 211 of the surrounding wall 21, not less than 90% of a peripheral area 25 outside the virtual line 3 is blocked with plug material 4.

7 Claims, 13 Drawing Sheets

EXHAUST GAS PURIFYING FILTER WITH REINFORCED PERIPHERAL AREA AND METHOD FOR MANUFACTURING THE SAME

BACKGROUND OF THE INVENTION

1. Field of the Invention

The present invention relates to an exhaust gas purifying filter for purifying an exhaust gas, by collecting particulates from the exhaust gas of an internal combustion engine, and a method for manufacturing the same.

2. Description of the Related Art

Conventionally, an exhaust gas purifying filter having a ceramic honeycomb structure acts as an exhaust gas purifying filter, for purifying an exhaust gas, by collecting particulates from the exhaust gas of an internal combustion engine.

The ceramic honeycomb structure comprises a surrounding wall, partition walls provided in a honeycomb pattern within the surrounding wall, and a plurality of cells partitioned by the partition walls and, at the same time, penetrating through from one end face of the ceramic honeycomb structure to the other.

In order to improve the efficiency of purification of the exhaust gas purifying filter, it is desired to make the partition walls thinner and to increase the porosity in the surrounding wall and the partition walls. However, if the partition wall is made thinner and the porosity is increased, the mechanical strength of the ceramic honeycomb structure is reduced. Therefore, a problem arises that the end portions of the ceramic honeycomb structure become more likely to fracture when catalysts are provided, when the structure is attached to an internal combustion engine, or the like.

In order to solve this problem, a ceramic honeycomb structure, whose cells in the vicinity of the peripheral portion are filled with plug material, has been proposed (for example, refer to Patent References 1 and 2).

[Patent Reference 1]
Japanese Examined Patent Publication (Kokoku) No. 63-12658
[Patent Reference 2]
Japanese Unexamined Patent Publication (Kokai) No. 7-246341

However, no definition is given as to the range of the peripheral area to be filled with the plug material in the conventional ceramic honeycomb structure. If the range of the peripheral area to be filled with the plug material is too large, a problem arises that the exhaust gas filtration area decreases and, at the same time, the pressure loss increases. On the other hand, if the peripheral area to be filled with the plug material is too small, it is not possible to secure a sufficient strength of the ceramic honeycomb structure.

Therefore, it is difficult to obtain an exhaust gas purifying filter having a high strength and an excellent efficiency of purification only by filling the vicinity of the peripheral portion with plug material.

SUMMARY OF THE INVENTION

The present invention has been developed with the above-problem being taken into consideration and the object is to provide an exhaust gas purifying filter having a high strength and an excellent efficiency of exhaust gas purification and a method for manufacturing the same.

An exhaust gas purifying filter according to a first aspect of the present invention has a ceramic honeycomb structure comprising: a surrounding wall; partition walls provided in a honeycomb pattern within the surrounding wall; and a plurality of cells partitioned by the partition walls and, at the same time, penetrating through from one end face of the ceramic honeycomb structure to the other. If a virtual line is drawn on the both end faces of the ceramic honeycomb structure by continuously connecting points at a distance of 1.0 to 3.0 times the pitch of the cells (cell pitch) in the direction toward the center from the inner surface of the surrounding wall, not less than 90% of the peripheral area outside the virtual line is blocked with plug material.

Next, the operation/working-effect of the present invention is described.

In the ceramic honeycomb structure, as described above, not less than 90% of the peripheral area of both end faces is blocked with plug material.

Therefore, the peripheral portions of both end faces of the above-mentioned ceramic honeycomb structure are reinforced. Moreover, as the above-mentioned virtual line is drawn by continuously connecting points at a distance of not less than 1.0 times the cell pitch in the direction toward the center from the inner surface of the surrounding wall, the width of the peripheral area to be plugged with the plug material is not less than 1.0 times the cell pitch. Because of this, sufficient strength of the ceramic honeycomb structure can be secured. Due to this, it is possible to prevent a fracture from occurring when the exhaust gas purifying filter is manufactured, handled, and so forth.

Moreover, as the above-mentioned virtual line is drawn by continuously connecting points at a distance of not more than 3.0 times the cell pitch in the direction toward the center from the inner surface of the surrounding wall, the width of the peripheral area to be plugged with the plug material is not more than 3.0 times the cell pitch. Because of this, in the exhaust gas purifying filter, the area of the peripheral area through which an exhaust gas cannot pass can be reduced sufficiently. Due to this, it is possible to secure the exhaust gas filtration area and, at the same time, to suppress the pressure loss in the exhaust gas. Therefore, it is possible to obtain an exhaust gas purifying filter having an excellent efficiency of purification.

As described above, according to the present invention, it is possible to obtain an exhaust gas purifying filter having a high strength and an excellent efficiency of exhaust gas purification.

A method for manufacturing an exhaust gas purifying filter according to a second aspect of the present invention comprises: a forming process for forming a ceramic honeycomb structure having a surrounding wall, partition walls provided in a honeycomb pattern within the surrounding wall, and a plurality of cells partitioned by the partition walls and, at the same time, penetrating through from one end face of the ceramic honeycomb structure to the other; a masking process for pasting mask tapes to the entire end faces of the ceramic honeycomb structure; a drilling process in which a virtual line is drawn by continuously connecting points at a distance of 1.0 to 3.0 times the pitch of the cells (cell pitch) in the direction toward the center from the inner surface of the surrounding wall and at least the mask tape pasted to the openings of the cells through which the virtual line passes and the openings of the cells outside the virtual line is drilled; and a plugging process in which not less than 90% of the peripheral area outside the virtual line is blocked with plug material after dipping the end faces into the plug material paste and forming the plug material in the openings of the cells other than those blocked with the mask tape.

According to the present manufacturing method, it is possible to form plug material in the peripheral area of the ceramic honeycomb structure both easily and securely.

Therefore, according to the second aspect of the present invention described above, it is possible to easily and surely manufacture an exhaust gas purifying filter having a high strength and an excellent efficiency of exhaust gas purification.

A method for manufacturing an exhaust gas purifying filter according to a third aspect of the present invention comprises: a forming process for forming a ceramic honeycomb structure having a surrounding wall, partition walls provided in a honeycomb pattern within the surrounding wall, and a plurality of cells partitioned by the partition walls and, at the same time, penetrating through from one end face of the ceramic honeycomb structure to the other; a masking process in which a virtual line is drawn on the end face of the ceramic honeycomb structure by continuously connecting points at a distance of 1.0 to 3.0 times the pitch of the cells (cell pitch) in the direction toward the center from the inner surface of the surrounding wall and a mask tape is pasted to the central area within the virtual line; and a plugging process in which not less than 90% of the peripheral area outside the virtual line is blocked with plug material after dipping the end faces into the plug material paste and forming the plug material in the openings of the cells other than those blocked with the mask tape.

According to the present manufacturing method, it is possible to form plug material in the peripheral area without drilling the mask tape in the peripheral area because the mask tape is not pasted to the peripheral area. Therefore, the number of man-hours can be reduced and it is possible to easily manufacture an exhaust gas purifying filter and, at the same time, reduce the manufacturing cost.

A method for manufacturing an exhaust gas purifying filter according to a fourth aspect of the present invention comprises: a forming process for forming a ceramic honeycomb structure having a surrounding wall, partition walls provided in a honeycomb pattern within the surrounding wall, and a plurality of cells partitioned by the partition walls and, at the same time, penetrating through from one end face of the ceramic honeycomb structure to the other; a masking process for pasting mask tapes to the entire end faces of the ceramic honeycomb structure; a cutting process in which a virtual line is drawn on the end face by continuously connecting points at a distance of 1.0 to 3.0 times the pitch of the cells (cell pitch) in the direction toward the center from the inner surface of the surrounding wall, and the mask tape pasted to the peripheral area outside the virtual line is cut and removed; and a plugging process in which not less than 90% of the peripheral area outside the virtual line is blocked with plug material after dipping the end faces into the plug material paste and forming the plug material in the openings of the cells other than those blocked with the mask tape.

According to the present manufacturing method, it is easy to paste mask tapes to the end faces of the ceramic honeycomb structure because an exact positional alignment of the mask tape is not necessary. Therefore, according to the fourth aspect of the present invention described above, it is possible to easily manufacture an exhaust gas purifying filter having a high strength and an excellent efficiency of exhaust gas purification.

A method for manufacturing an exhaust gas purifying filter according to a fifth aspect of the present invention comprises: a forming process for forming a ceramic honeycomb structure having a surrounding wall, partition walls arranged in a honeycomb pattern within the surrounding wall, and a plurality of cells partitioned by the partition walls and, at the same time, penetrating through from one end face of the ceramic honeycomb structure to the other; a masking process for pasting mask tapes to the entire end faces of the ceramic honeycomb structure; a cutting process in which a virtual line is drawn on the end face by continuously connecting points at a distance of 1.0 to 3.0 times the pitch of the cells (cell pitch) in the direction toward the center from the inner surface of the surrounding wall, and the mask tape is cut along the partition walls of the cells through which the virtual line passes and, at the same time, the mask tape outside the virtual line is removed; and a plugging process in which not less than 90% of the peripheral area outside the virtual line is blocked with plug material after dipping the end faces into the plug material paste and forming the plug material in the openings of the cells other than those blocked with the mask tape.

According to the present manufacturing method, by removing even the mask tape that covers the specified cells through which the virtual line passes, it is possible to open the entire openings of the specified cells. Therefore, it is possible to form the plug material in the entire openings of the specified cells through which the virtual line passes.

Moreover, it is not necessary to drill the mask tape in the openings of the cells through which the virtual line passes.

Therefore, according to the fifth aspect of the present invention, it is possible to easily manufacture an exhaust gas purifying filter having a high strength and an excellent efficiency of exhaust gas purification.

In the first aspect of the present invention described above, the cell pitch is defined by the following expression (1)

$$1 \text{ pitch} = 25.4/(\text{number of meshes})^{1/2} \qquad (1)$$

where, the number of meshes is the number of cells within a square with the side of 25.4 mm.

Therefore, if the cell has a square section, the length of 1 pitch is equal to the length of one side of the cell plus the thickness of the partition wall.

Moreover, the percentage 90% of the peripheral area to be blocked with the plug material is on the basis of the total area of the openings of the cells contained in the peripheral area.

It is also possible to block a partial area or the whole area of the opening of each cell, through which the virtual line passes, with the plug material.

It makes the manufacturing process more simple to block a partial area of the opening of each cell with the plug material. When the whole area of the opening of each cell is blocked with the plug material, an exhaust gas purifying filter having a higher strength can be obtained.

It is possible to use a ceramic honeycomb structure having the surrounding wall and the partition walls with a porosity of not less than 50%.

In this case, the exhaust gas filtration area and the catalyst carrying area are increased and it is possible to obtain an exhaust gas purifying filter having a high efficiency of purification.

When the porosity is less than 50%, it is likely that the efficiency of exhaust gas purification cannot be improved sufficiently.

It is preferable for the surrounding wall to have a thickness of 0.2 to 0.8 mm.

In this case, it is possible to secure the strength and the efficiency of exhaust gas purification of the exhaust gas purifying filter.

When the thickness is less than 0.2 mm, it is likely that a sufficient strength of the exhaust gas purifying filter cannot be secured. On the other hand, when the thickness exceeds 0.8 mm, it is likely that the exhaust gas filtration area is decreased and, at the same time, the pressure loss is increased, therefore, a sufficient efficiency of exhaust gas purification cannot be secured.

It is preferable that the ceramic honeycomb structure is made of cordierite.

In this case, it is possible to form a ceramic honeycomb structure having a surrounding wall and partition walls with a desired porosity both easily and inexpensively.

The exhaust gas purifying filter may be used for a diesel engine and purifies the exhaust gas discharged from the diesel engine and there may mixedly exist both openings of the cells provided with the plug material and those of the cells not provided with the plug material in such a way that they are arranged alternately in the central area within the virtual line on the end face of the ceramic honeycomb structure.

In this case, it is possible to provide an exhaust gas purifying filter for a diesel engine having a high strength and an excellent efficiency of exhaust gas purification.

It is preferable that the virtual line is a line drawn by continuously connecting points at a distance of 1.0 to 2.0 times the cell pitch in the direction toward the center from the inner surface of the surrounding wall.

In this case, it is possible to maintain a sufficient strength of the ceramic honeycomb structure and, at the same time, to obtain an exhaust gas purifying filter having an excellent efficiency of purification (refer to the seventh embodiment).

It is preferable that the partition wall has a thickness of 0.25 to 0.40 mm.

In this case, it is possible to collect abundant particulates from an exhaust gas and, at the same time, to reduce the pressure loss of the exhaust gas.

Therefore, it is possible to obtain an exhaust gas purifying filter having a more excellent purification efficiency.

When the thickness of the partition wall is less than 0.25 mm, the particulates are likely to escape through the partition wall and there is the possibility that the particulate collection efficiency decreases. On the other hand, when the thickness of the partition wall exceeds 0.40 mm, there is the possibility that the pressure loss of the exhaust gas increases (refer to the eighth embodiment).

(Seventh Embodiment)

In the present embodiment, as shown in FIG. 18, a relationship between the width of the peripheral area blocked with plug material and the rate of rise in pressure loss, and between that and the depth of fracture, of the exhaust gas purifying filter is assessed.

In other words, test samples, including those whose widths of the peripheral area to be plugged are one cell pitch, two cell pitches, three cell pitches and four cell pitches, respectively, and one whose peripheral area is not plugged, are prepared.

Next, in the second aspect of the present invention, it is possible to carry out the masking process, the drilling process and the plugging process for both end faces of the ceramic honeycomb structure, respectively.

In the drilling process, as for the mask tape pasted to the openings of the cells within the virtual line, it is also possible to drill the mask tape pasted to one of two neighboring openings of the cells.

In this case, there mixedly exist both openings of the cells provided with the plug material and those of the cells not provided with the plug material in such a way that they are arranged alternately in the central area within the virtual line on the end face of the ceramic honeycomb structure. As a result, it is possible to obtain an exhaust gas purifying filter for a diesel engine having a high strength and an excellent efficiency of exhaust gas purification.

Next, in the third aspect of the present invention, it is preferable to carry out the drilling process for drilling at least the mask tape that covers the openings of the cells through which the virtual line passes after the masking process and before the plugging process.

In this case, it is possible to form the plug material even in all of the openings of the cells through which the virtual line passes. Therefore, it is possible to obtain an exhaust gas purifying filter having a higher strength.

In the fourth aspect of the present invention, it is preferable to carry out the drilling process for drilling at least the mask tape that covers the openings of the cells through which the virtual line passes after the cutting process and before the plugging process.

In this case, it is possible to form the plug material even in all of the openings of the cells through which the virtual line passes. Therefore, it is possible to obtain an exhaust gas purifying filter having a higher strength.

In the third aspect or the fourth aspect of the present invention, as for the mask tape pasted to the openings of the cells within the virtual line, it is possible to drill the mask tape pasted to one of two neighboring openings of the cells after the masking process and before the plugging process.

In this case, there mixedly exist both openings of the cells provided with the plug material and those of the cells not provided with the plug material in such a way that they are arranged alternately in the central area within the virtual line on the end face of the ceramic honeycomb structure. As a result, it is possible to obtain an exhaust gas purifying filter for a diesel engine having a high strength and an excellent efficiency of exhaust gas purification.

The present invention may be more fully understood from the description of the preferred embodiments of the invention set forth below, together with the accompanying drawings.

DESCRIPTION OF THE PREFERRED EMBODIMENTS (First Embodiment)

The exhaust gas purifying filter and the method for manufacturing the same according to the present invention are described below by using FIG. 1 to FIG. 11.

Figure 1:
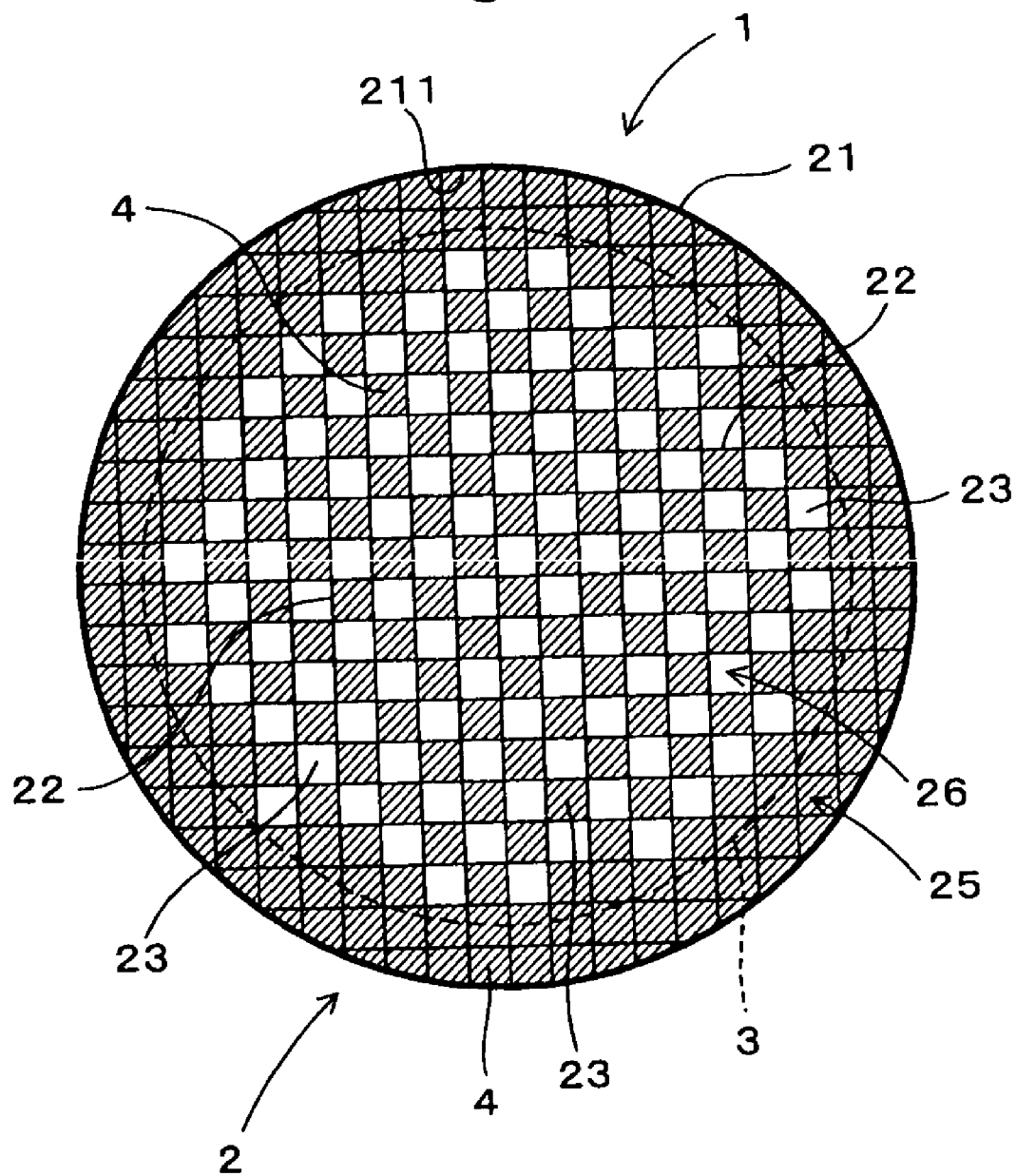
FIG. 1 is a front view of an exhaust gas purifying filter in a first embodiment of the present invention.
Figure 2:
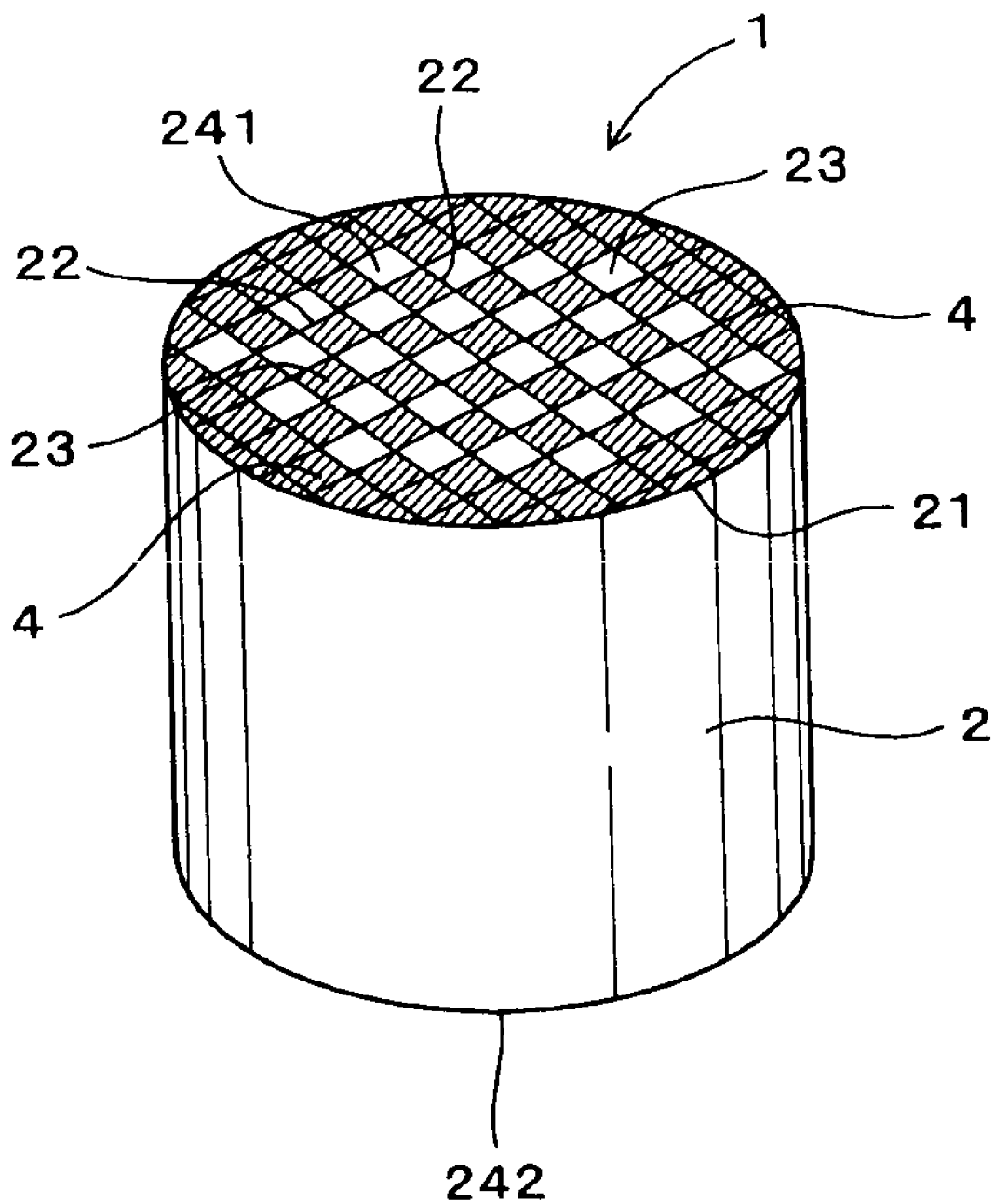
FIG. 2 perspective view of the exhaust gas purifying filter in the first embodiment.
Figure 3:
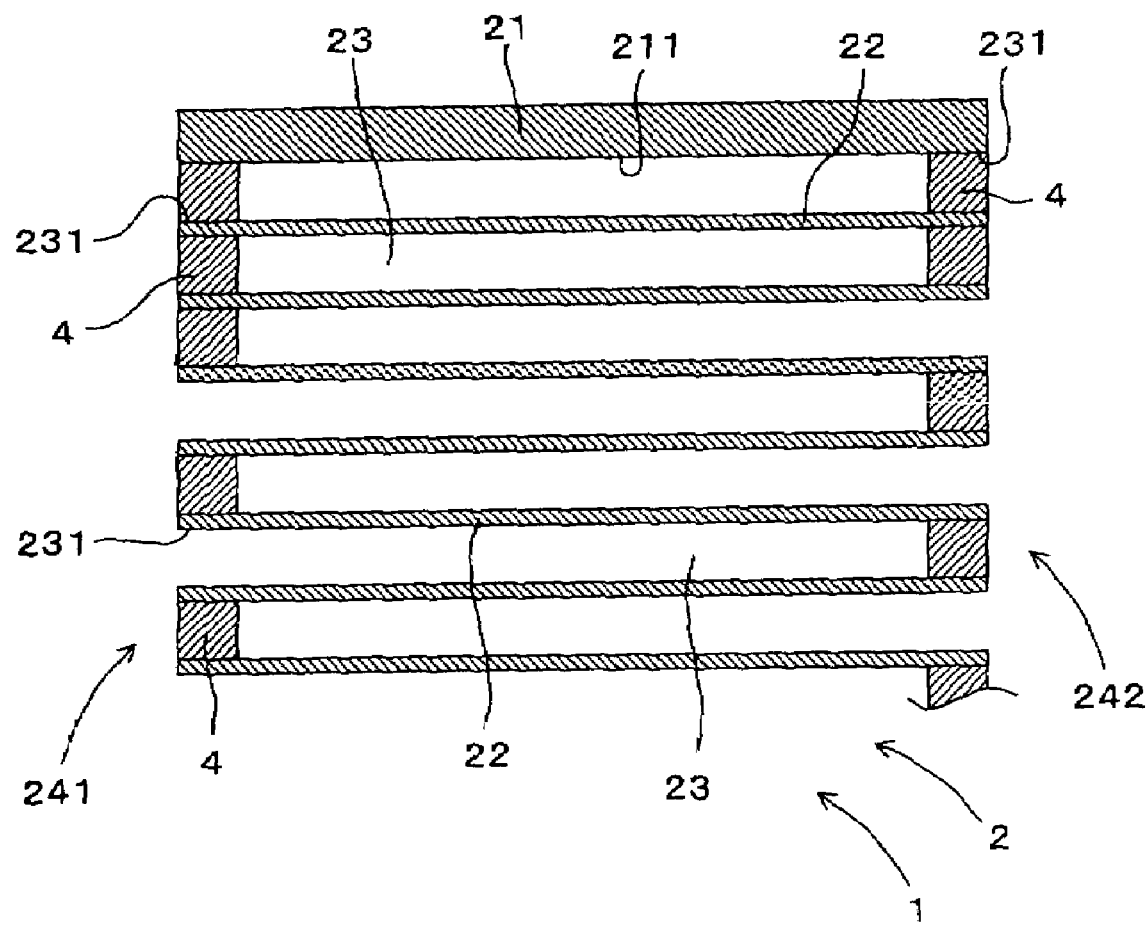
FIG. 3 is a sectional view of the exhaust gas purifying filter in the direction in which a cell penetrates through in the first embodiment.

As shown in FIG. 1 to FIG. 3, an exhaust gas purifying filter 1 has a ceramic honeycomb structure 2 comprising a surrounding wall 21, partition walls 22 arranged in a honeycomb pattern within the surrounding wall 21, and a plurality of cells 23 partitioned by the partition walls 22 and, at the same time, penetrating through both end faces 241 and 242.

On both end faces 241 and 242 of the ceramic honeycomb structure 2, if a virtual line 3 is drawn by continuously connecting points at a distance of 1.0 to 3.0 times the cell pitch in the direction toward the center from an inner surface 211 of the surrounding wall 21, not less than 90% of a peripheral area 25 outside the virtual line 3 are blocked with plug material 4, as shown in FIG. 1.

Figure 4:
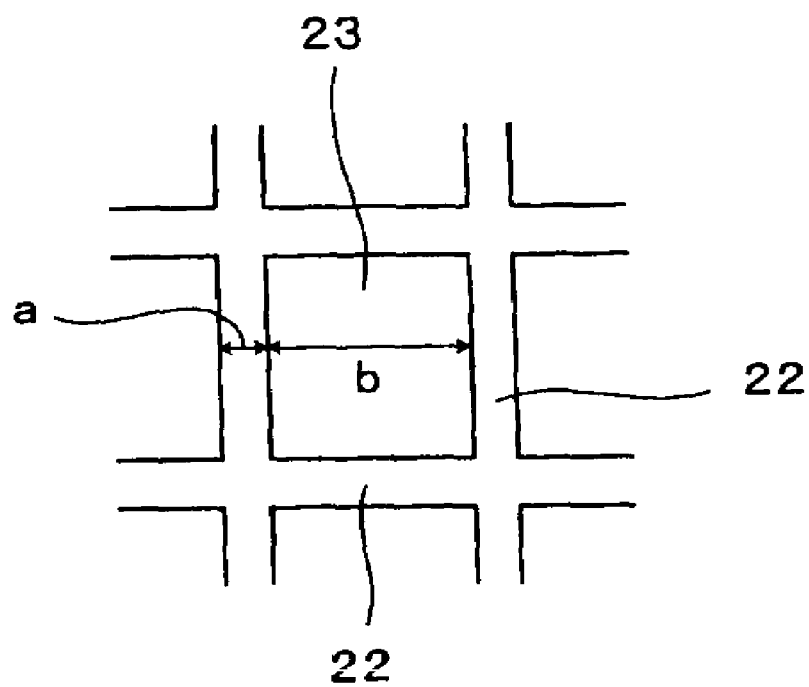
FIG. 4 is a front view of the opening of a cell in the first embodiment.

The definition of the cell pitch is defined by the above-mentioned expression (1), and in the present embodiment, as shown in FIG. 4, as the section of the cell 23 is square the length of a pitch is equal to the length a of a side of the cell 23 plus the thickness b of the partition wall 22.

In concrete terms, the length a of the side of the cell 23 described above is 1.07 to 1.27 mm, and the thickness b of the partition wall 22 is 0.25 to 0.35 mm. Therefore, the pitch is 1.32 to 1.62 mm.

The surrounding wall 21 has a thickness of 0.2 to 0.8 mm. The plug material 4 is plugged into an opening 231 of the cell 23 to a depth of 1 to 6 mm from the end faces 241 and 242.

The above-mentioned ceramic honeycomb structure 2 has the surrounding wall 21 and the partition walls 22 with a porosity of not less than 50%.

Moreover, the ceramic honeycomb structure 2 is made of cordierite. The plug material 4 is also made of cordierite.

The exhaust gas purifying filter 1 is one for a diesel engine for purifying an exhaust gas discharged from a diesel engine. As shown in FIG. 1 and FIG. 3, in a central area 26 within the above-mentioned virtual line 3 on the end faces 241 and 242 of the ceramic honeycomb structure 2, the openings 231 of the cells 23 provided with the plug material 4 and the openings 231 of the cells 23 not provided with the plug material 4 mixedly exist in such a way that they are arranged alternately.

In other words, as shown in FIG. 3, the cell 23 in the central area 26 has totally two openings 231 at its ends and one of the two openings 231 is blocked with the plug material 4 in such a way that the openings of two neighboring cells 23 in which the plug material 4 is formed are opposite to each other.

Next, the method for manufacturing the exhaust gas purifying filter 1 in the present embodiment is described below.

First a forming process is carried out for forming the ceramic honeycomb structure 2 having the surrounding wall 21, the partition walls 22 and the plurality of cells 23.

Figure 5:
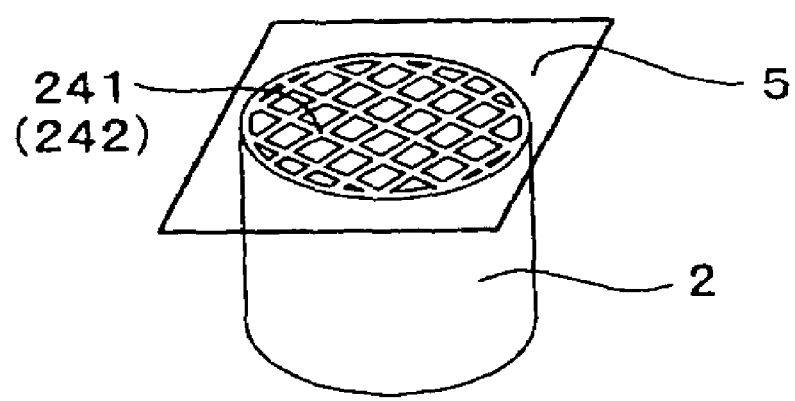
FIG. 5 is an explanatory perspective view that illustrates a state in which a mask tape is pasted to a ceramic honeycomb structure in the first embodiment.

Next, a masking process is carried out for pasting a mask tape 5 to the entire end face 241 of the ceramic honeycomb structure 2, as shown in FIG. 5.

Figure 7:
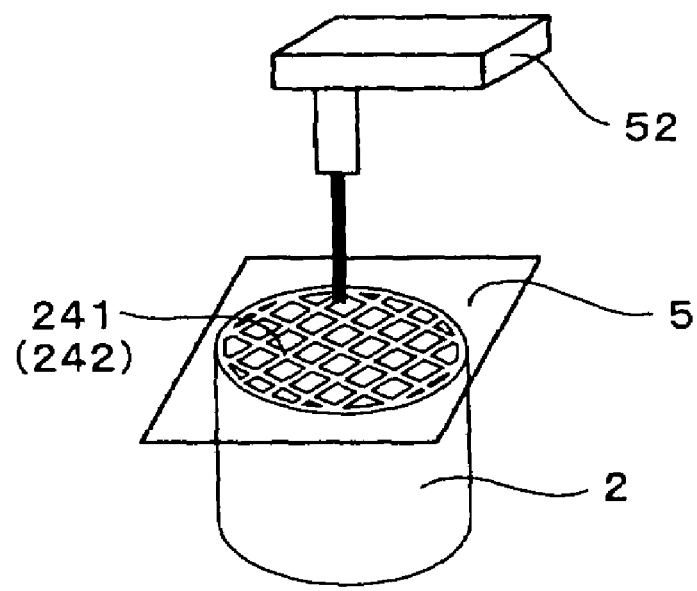
FIG. 7 is an explanatory perspective view that illustrates how the mask tape pasted to the ceramic honeycomb structure is drilled, in the first embodiment.

Then, as shown in FIG. 7, the mask tape 5 pasted to the openings of the cells 23 through which the above-mentioned virtual line 3 (FIG. 1) passes and the openings of the cells 23 outside the virtual line 3 is drilled. At this time, a drilling process is carried out for drilling the mask tape 5 on the openings 231 of the cells 23 in the central area 26 in a checkerboard pattern.

Figure 8:
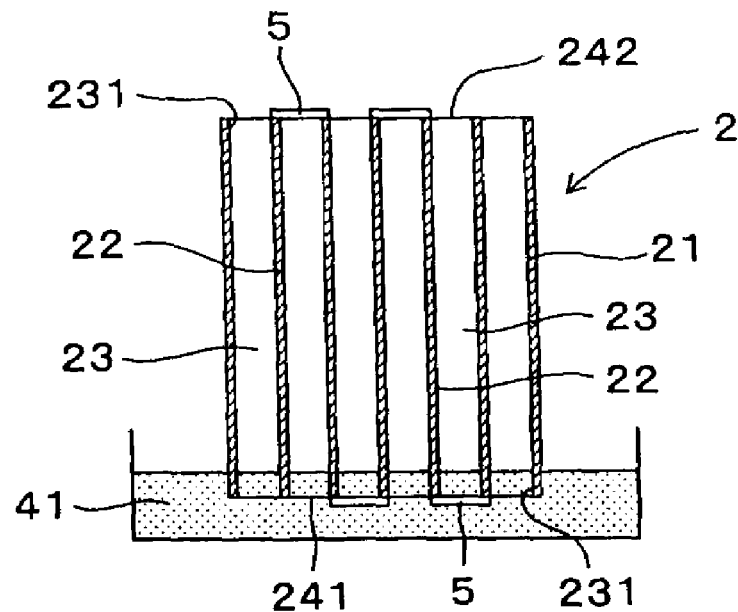
FIG. 8 is an explanatory sectional view that illustrates a state in which the end face of the ceramic honeycomb structure is dipped into the slurry of plug material, in the first embodiment.
Figure 9:
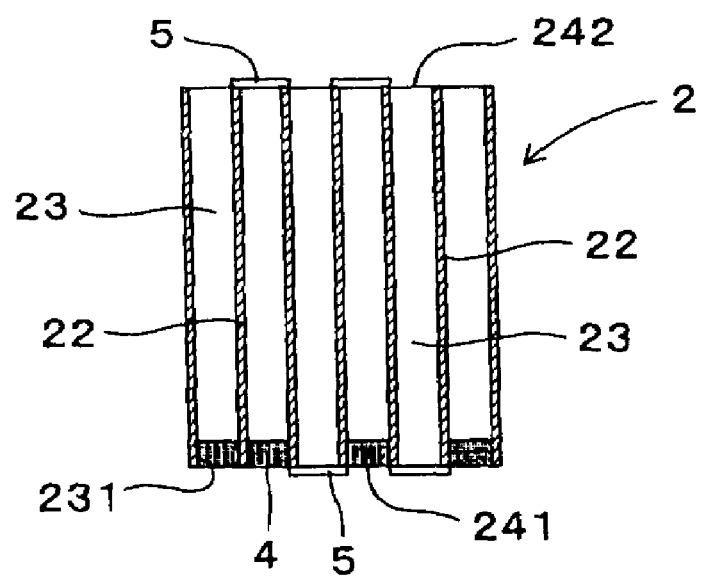
FIG. 9 is an explanatory sectional view that illustrates a state after dipping, in the first embodiment.

After this, as shown in FIG. 8, the end face 241 is dipped into plug material paste 41 and, as shown in FIG. 9, a plugging process is carried out for forming the plug material 4 in the openings 231 of the cells 23 other than those blocked with the mask tape 5.

Figure 10:
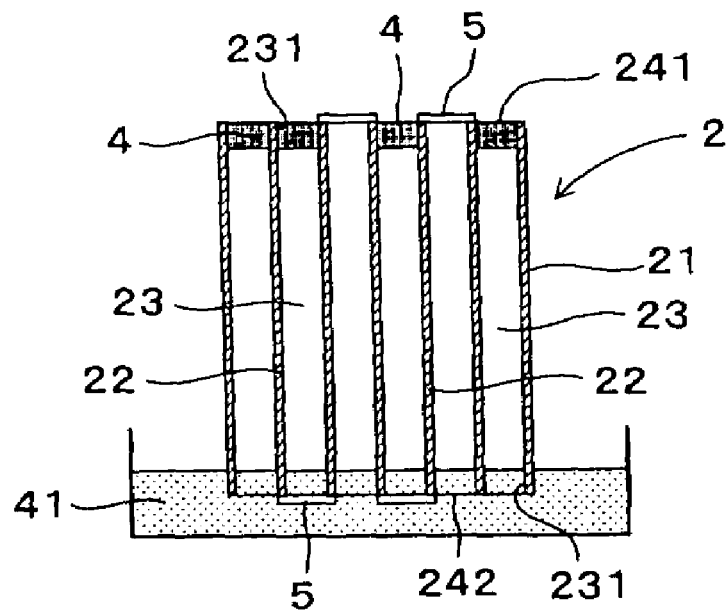
FIG. 10 is an explanatory sectional view that illustrates a state in which the other end face of the ceramic honeycomb structure is dipped into the slurry of the plug material, in the first embodiment.
Figure 11:
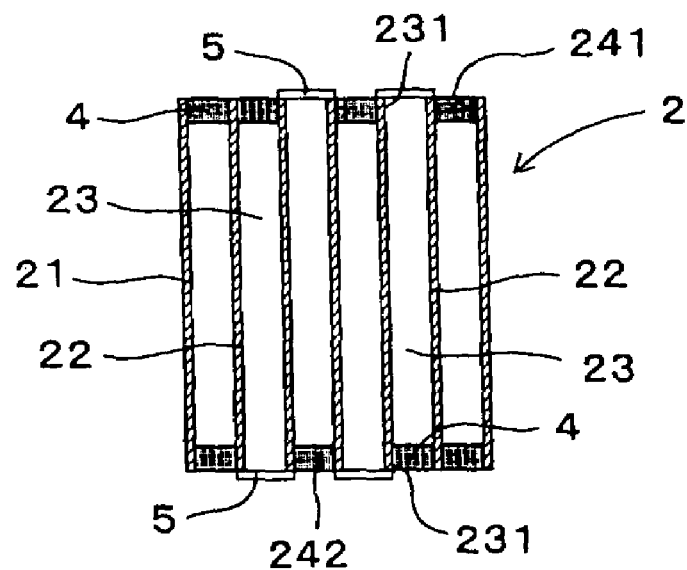
FIG. 11 is an explanatory sectional view that illustrates a state after both end faces of the ceramic honeycomb structure are dipped, in the first embodiment.

Moreover, as shown in FIG. 10 and FIG. 11, the plug material 4 is formed also on the other end face 242 of the ceramic honeycomb structure 2.

In this way, as shown in FIG. 1, not less than 90% of the peripheral area 25 outside the virtual line 3 on both end faces 241 and 242 of the ceramic honeycomb structure 2 is blocked with the plug material 4.

Figure 6:
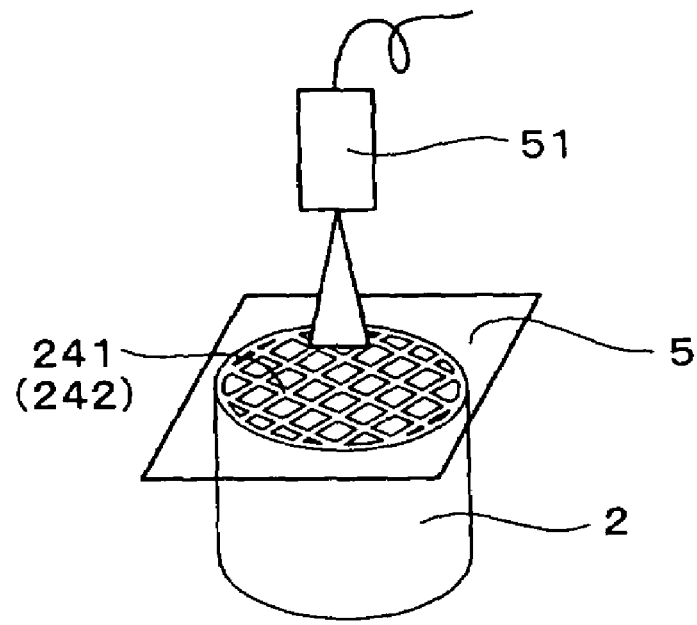
FIG. 6 is an explanatory perspective view that illustrates how the position of the mask tape to be drilled is detected in the first embodiment.

Before holes are drilled in the mask tape, the image of the end face 241 (242) of the ceramic honeycomb structure 2 is captured by using a camera 51 and the positions to be drilled are detected by processing the image, as shown in FIG. 6. Then, the mask tape 5 is drilled by using a laser 52, as shown in FIG. 7.

As described above, after the plug material 4 is formed in the openings 231 of the fixed cells 23, the exhaust gas purifying filter 1, is obtained by baking the ceramic honeycomb structure 2.

Moreover, it is possible for the partition walls 23 of the exhaust gas purifying filter 1 to carry catalysts.

Next, the operation/working-effect of the present embodiment is described below.

As described above, not less than 90% of the peripheral area 25 on the end faces 241 and 242 of the ceramic honeycomb structure 2 is blocked with the plug material 4.

Therefore, the peripheral portion, that is, the corner portion, of both the end faces 241 and 242 of the ceramic honeycomb structure 2 is reinforced. Moreover, as the above-mentioned virtual line 3 is drawn by continuously connecting points at a distance of more than 1.0 times the cell pitch in the direction toward the center from the inner surface 211 of the surrounding wall 21, the width of the peripheral area 25 to be plugged with the plug material 4 is not less than 1.0 times the cell pitch. Therefore, it is possible to secure the sufficient strength of the ceramic honeycomb structure 2. Due to this, it is possible to prevent a fracture from occurring when the exhaust gas purifying filter 1 is manufactured, handled, and so forth.

Moreover, as the virtual line 3 is drawn by continuously connecting points at a distance not more than 3.0 times the cell pitch in the direction toward the center from the inner surface 211 of the surrounding wall 21, the width of the peripheral area 25 to be plugged with the plug material 4 is not more than 3.0 times the cell pitch. Therefore, it is possible to sufficiently reduce the area in the peripheral area 25 which cannot pass an exhaust gas in the exhaust gas purifying filter 1. Due to this, it is possible to secure the exhaust gas filtration area and, at the same time, to suppress the pressure loss of exhaust gas. As a result, the exhaust gas purifying filter 1 having an excellent efficiency of purification can be obtained.

As the ceramic honeycomb structure 2 has the surrounding wall 21 and the partition walls 22 with a porosity of not less than 50%, the exhaust gas purifying filter 1 having an excellent efficiency of purification can be obtained.

In this case, if the peripheral area 25 is not provided with the plug material 4, a fracture is likely to occur because the strength of the ceramic honeycomb structure 2 is insufficient. Therefore, the strength of the ceramic honeycomb structure 2 is increased by forming the plug material 4 in the peripheral area 25, as described above, and the strength of the exhaust gas purifying filter 1 can be increased as a result.

As the surrounding wall 21 has a thickness of 0.2 to 0.8 mm, it is possible to secure the strength and the efficiency of exhaust gas purification of the exhaust gas purifying filter 1.

Moreover, as the ceramic honeycomb structure 2 is made of cordierite, it is possible to form the ceramic honeycomb structure 2 having the surrounding wall 21 and the partition walls 22 with a desired porosity both easily and inexpensively.

As described above, according to the present embodiment, it is possible to obtain an exhaust gas purifying filter having a high strength and an excellent efficiency of exhaust gas purification.

(Second Embodiment)

Figure 12:
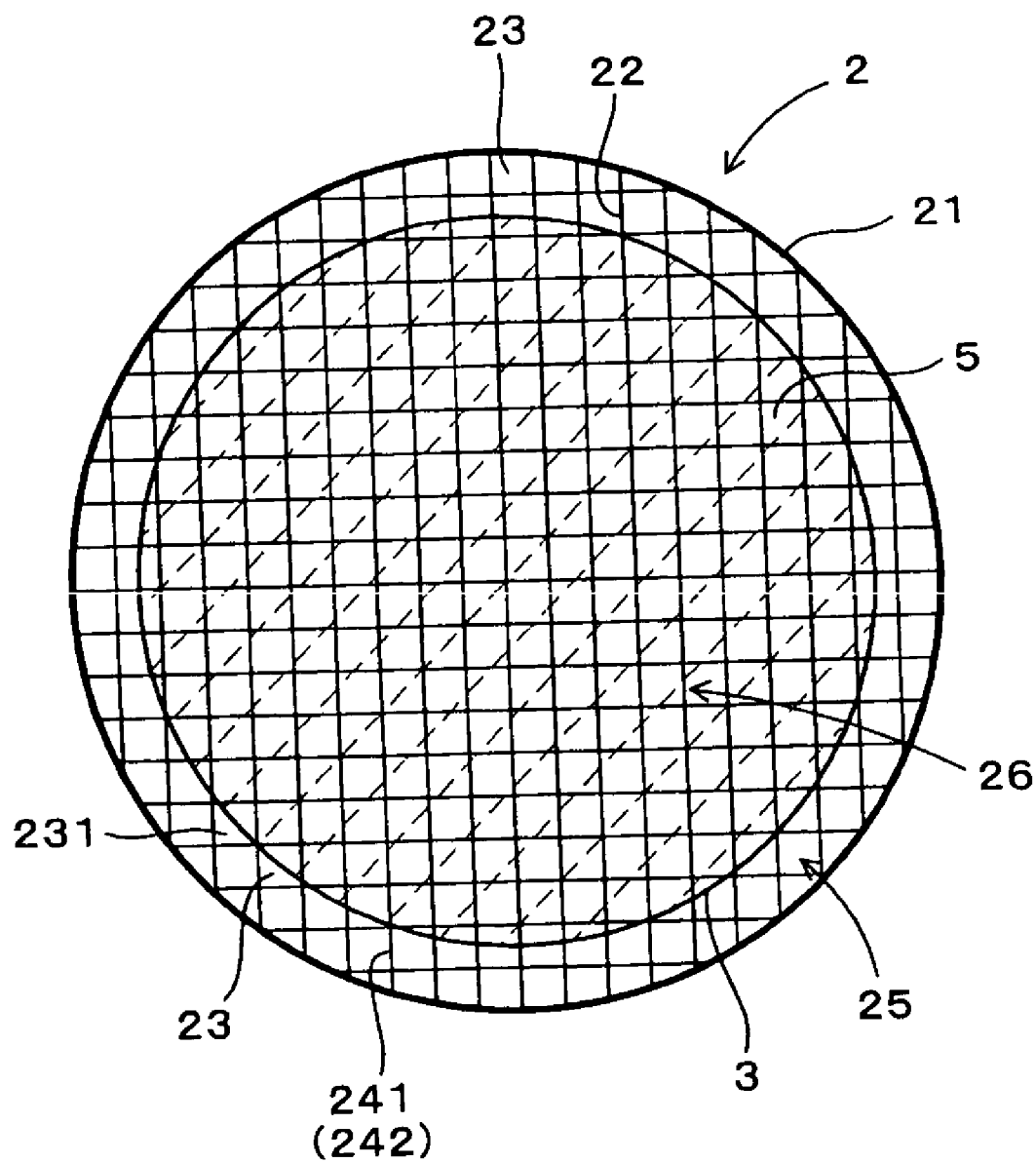
FIG. 12 is a front view of a ceramic honeycomb structure to whose end face a mask tape is pasted in a second embodiment of the present invention.
Figure 13:
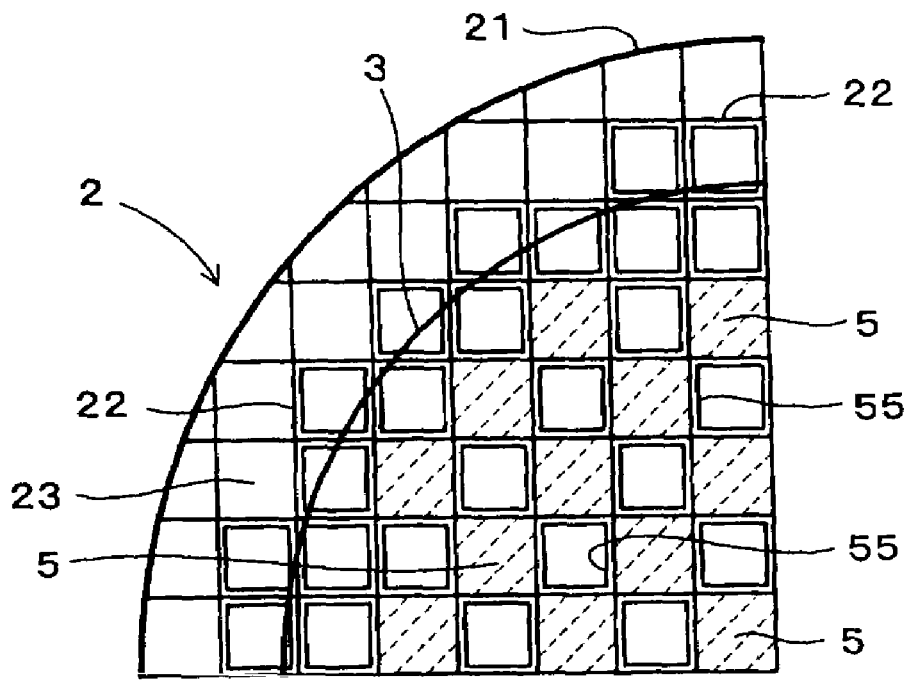
FIG. 13 is an explanatory view that illustrates a state in which the mask tape is drilled in the second embodiment of the present invention.

In the present embodiment, the exhaust gas purifying filter 1 is manufactured by a method different from that in the first embodiment, as shown in FIG. 12 and FIG. 13.

In other words, on the end face 241 (242) of the ceramic honeycomb structure 2 shown in the first embodiment, the mask tape 5 is pasted to the central area 26 within the virtual line 3, as shown in FIG. 12.

Therefore, the mask tape 5 has a shape whose outline coincides with the virtual line 3.

Then, before the plugging process, as shown in FIG. 13, the drilling process is carried out for drilling the mask tape 5 which covers the openings 231 of the cells 23 through which the virtual line 3 passes. In this drilling process, the mask tape 5 in the central area 26 within the virtual line 3 is also drilled in a checkerboard pattern. In FIG. 13, reference number 55 denotes the drilled parts.

Others are the same as the first embodiment.

According to the present manufacturing method, it is possible to form the plug material 4 in the peripheral area 25 without drilling the mask tape 5 in the peripheral area 25 because the mask tape 5 is not pasted to the peripheral area 25. Therefore, the number of man-hours for the drilling process can be reduced and it is possible to easily manufacture the exhaust gas purifying filter 1 and, at the same time, to reduce the manufacturing cost.

Others are the same as the first embodiment.

(Third Embodiment)

Figure 14:
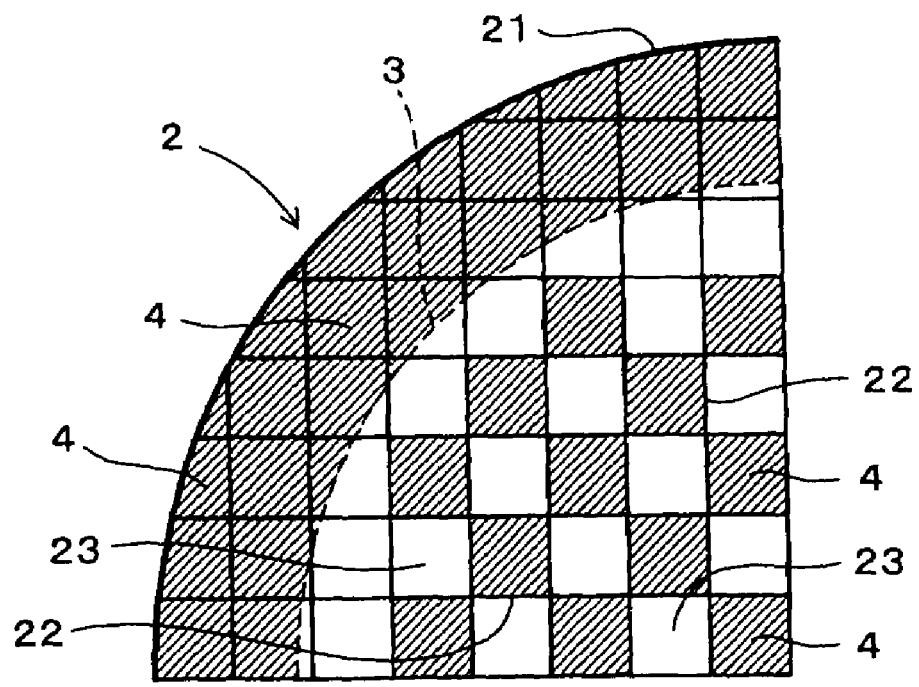
FIG. 14 is a front view of an exhaust gas purifying filter in a third embodiment of the present invention.

In the present embodiment, the plug material 4 is partly formed in the cells 3 through which the virtual line 3 passes in the exhaust gas purifying filter 1, as shown in FIG. 14.

In other words, the forming process and the masking process are first carried out as in the second embodiment (refer to FIG. 12). Then, the cells 23 through which the virtual line 3 passes are not drilled in the drilling process.

Others are the same as the second embodiment.

Due to this, the plug material 4 is formed as a partial plug in the cells 3 through which the virtual line 3 passes, as shown in FIG. 14. In this case, it is possible to reduce the number of man-hours for the drilling process by further reducing the number of positions to be drilled.

Others have the same operation/working-effect as that in the second embodiment.

(Fourth Embodiment)

In the present embodiment, the mask tape 5 is pasted to the entire end face 241 (242) of the ceramic honeycomb structure 2 in the masking process, and then a cutting process is carried out for cutting the mask tape 5 along the virtual line 3.

After the cutting process, the exhaust gas purifying filter 1 is manufactured by the same method as that in the second or third embodiment.

A laser, for example, is used to cut the mask tape 5.

Others are the same as the first embodiment.

According to the present manufacturing method, when the mask tape 5 is pasted to the end faces 241 and 242 of the ceramic honeycomb structure 2, pasting is easy because no exact positional alignment of the mask tape 5 is required. Therefore, it is possible to easily manufacture an exhaust gas purifying filter having a high strength and an excellent efficiency of exhaust gas purification.

Others have the same operation/working-effect as that in the first embodiment.

(Fifth Embodiment)

Figure 15:
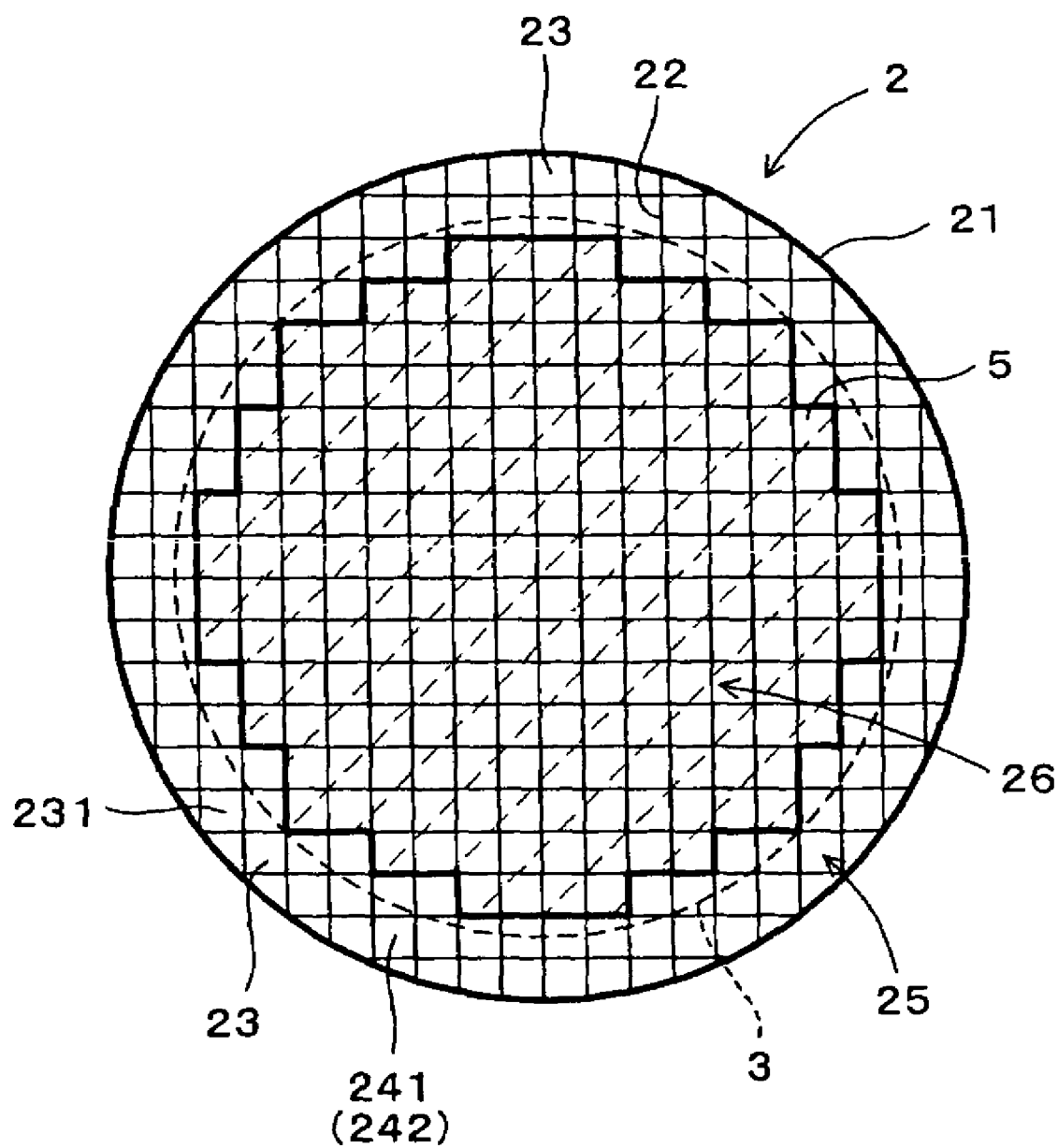
FIG. 15 is an explanatory view that illustrates a state in which a mask tape pasted to the end face of a ceramic honeycomb structure is cut in a fifth embodiment of the present invention.

In the present embodiment, the mask tape 5 is pasted to the entire end face 241 (242) of the ceramic honeycomb structure 2 in the masking process, and in the cutting process, the mask tape 5 is cut along the partition walls 22 of the cells 23 through which the virtual line 3 passes and, at the same time, the mask tape 5 outside the partition walls 22 is removed, as shown in FIG. 15.

Therefore, the cutting line forms a closed curve which encloses the maximum area which can be drawn along the partition walls 22 within the virtual line 3.

Then, the exhaust gas purifying filter 1 is manufactured by the same method as in the first embodiment.

A laser, for example, is used to cut the mask tape 5.

Others are the same as the first embodiment.

According to the present manufacturing method, it is possible to open the whole of the openings 231 of the specified cells 23, through which the virtual line 23 passes, by removing the mask tape 5 which covers the specified cells 23. Therefore, it is possible to form the plug material 4 in all of the openings 231 of the cells 23 through which the virtual line 3 passes.

Moreover, it is not necessary to drill the openings 231 of the cells 23 through which the virtual line 3 passes.

Therefore, according to the present embodiment, it is possible to easily manufacture an exhaust gas purifying filter having a high strength and an excellent efficiency of exhaust gas purification.

Others have the same operation/working-effect as that in the first embodiment.

(Sixth Embodiment)

Figure 16:
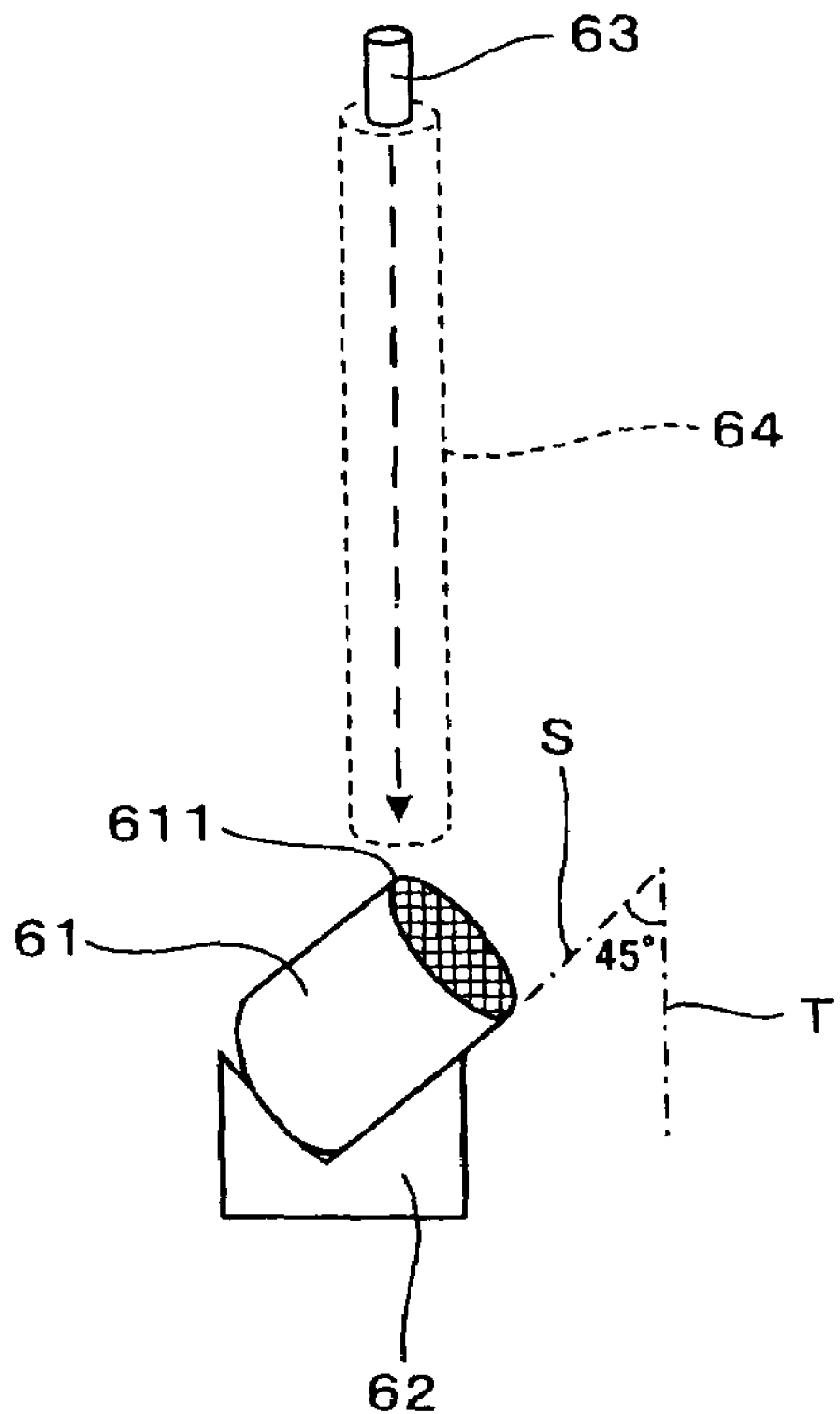
FIG. 16 is an explanatory view of a fracture test method in a sixth embodiment of the present invention.
Figure 17:
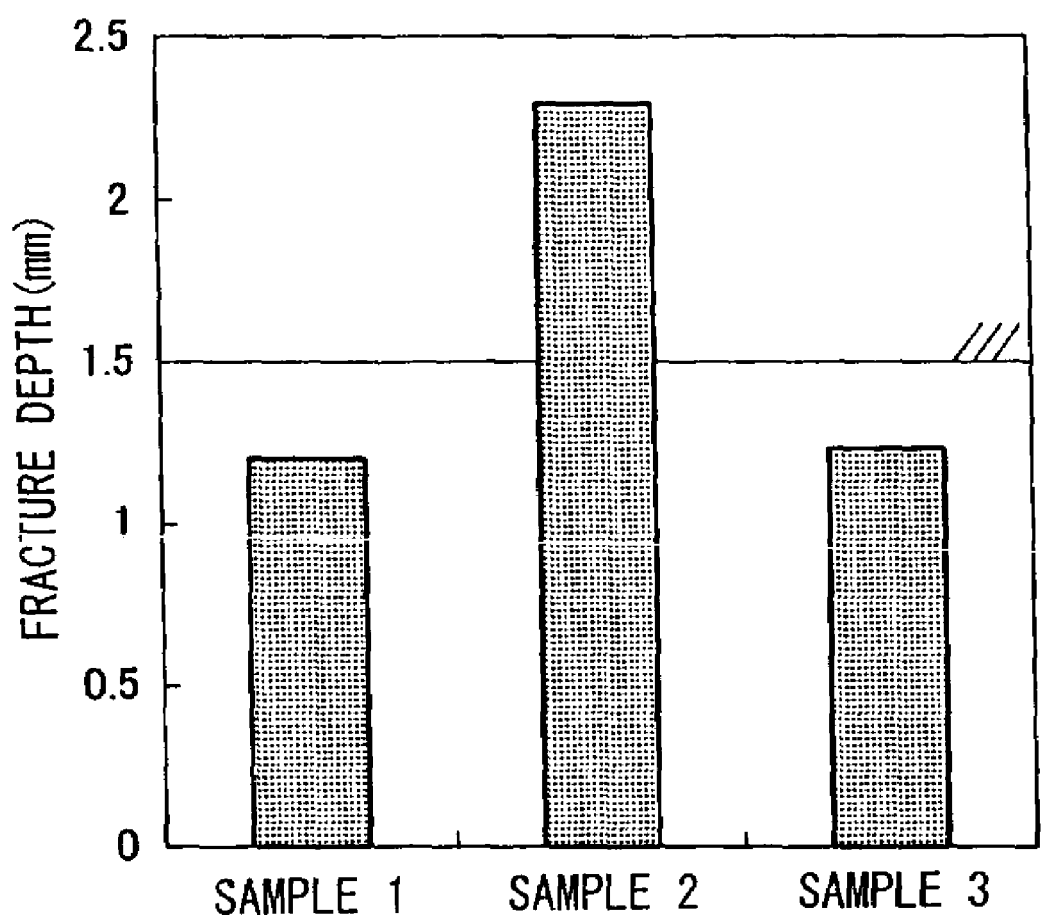
FIG. 17 is a graph that shows the test results in the sixth embodiment.

In the present embodiment, the exhaust gas purifying filter according to the present invention is tested to examine how it fractures, as shown in FIGS. 16 and 17.

The exhaust gas purifying filter of the present invention, that is, the exhaust gas purifying filter in whose peripheral area plug material is formed, is referred to as test sample 1.

A ceramic honeycomb structure similar to that used in test sample 1, in whose peripheral area plug material is not formed, is referred to as test sample 2.

A monolith 3 mil product having a relatively low porosity is referred to as test sample 3.

Various pieces of data for each test sample are shown in table 1.

TABLE 1

|  | Test sample 1 | Test sample 2 | Test sample 3 |
|---|---|---|---|
| Plug material in the peripheral area | In existence | Non-existent | Non-existent |
| Dimension (diameter × height) | 129 × 50 mm | 129 × 50 mm | 129 × 50 mm |
| Thickness in surrounding wall | 0.6 mm | 0.6 mm | 0.6 mm |
| Thickness in partition wall | 0.3 mm | 0.3 mm | 0.09 mm |
| Number of cells | 300 meshes | 300 meshes | 600 meshes |
| Material | Cordierite | Cordierite | Cordierite |
| Porosity | 65% | 65% | 35% |

In the test, each ceramic honeycomb structure 61 is mounted on a support base 62 in a state in which the direction T in which the cell penetrates through the honeycomb structure 61 is tilted with respect to the vertical direction S so that the angle between T and S is 45 degrees, as shown in FIG. 16.

Then, a cylindrical lead weight 63 having a base diameter of 20 mm and a height of 30 mm and weighing 100 g is dropped freely from 30 cm above to a corner portion 611 of the ceramic honeycomb structure 61.

The weight 63 is dropped through a cylindrical guide 64 provided in the vertical direction.

In this way, the depth of the fracture which occurs at the corner portion 611 of each ceramic honeycomb structure 61 is measured. This test is conducted five times for each test sample.

The results of the test are shown in FIG. 17. The values shown in the figure are the average of the results of the test conducted five times.

As obvious from FIG. 17, test sample 1 according to the present invention exhibits a depth of a fracture considerably less than that of test sample 2 in whose peripheral area no plug material is provided.

Although test sample 1 has a porosity of as large as 65%, the depth of a fracture thereof is substantially the same as that of the monolithic test sample 3 whose porosity is as low as 35%.

From these results, it is concluded that, according to the present invention, it is possible to obtain an exhaust gas purifying filter which can sufficiently prevent the occurrence of a fracture and which is excellent in strength.

The rate of rise in pressure loss is a quantity based on the pressure loss of a test sample whose peripheral area is not plugged. The pressure loss is a value obtained as a difference in pressure between that at one end and that at the other of the exhaust gas purifying filter when air at room temperature flows through the exhaust gas purifying filter at a rate of 5 m³/min. The pressure loss in the eighth embodiment, to be described later, is also a value obtained in this manner.

Figure 18:
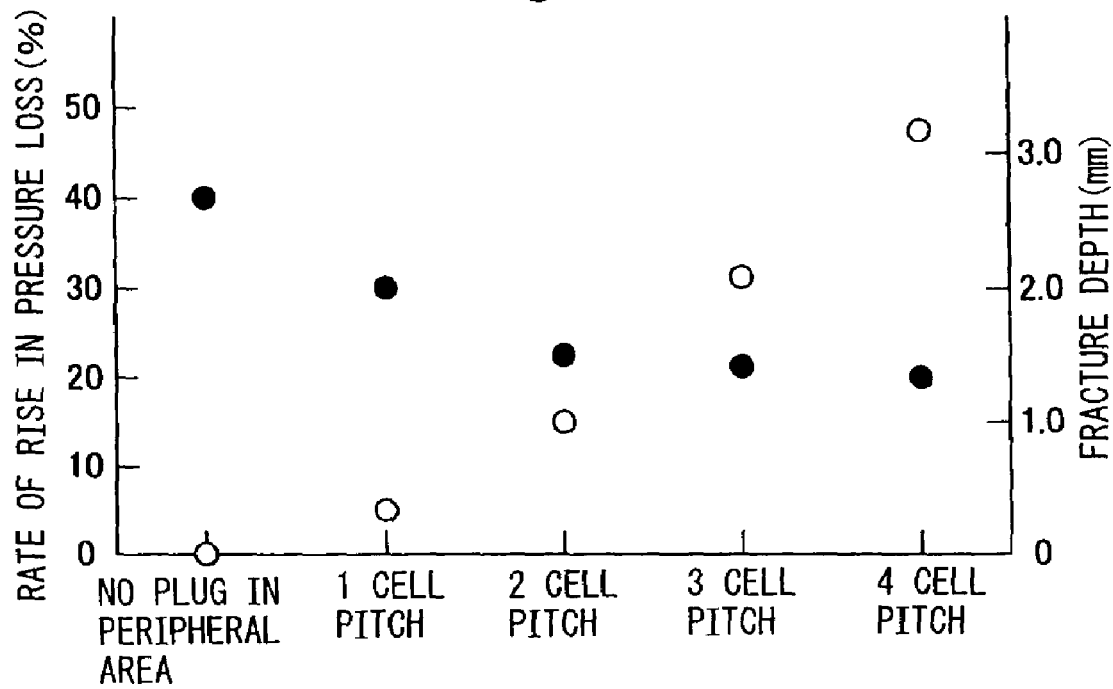
FIG. 18 is a graph that shows the measurement results in the seventh embodiment.

The depth of fracture is measured by the fracture testing method described in the sixth embodiment. In FIG. 18, the rate of rise in pressure loss is denoted by while circles and the depth of fracture is denoted by black circles.

As shown in FIG. 18, the rate of rise in pressure loss remarkably increases for the test samples having the peripheral area whose width to be plugged is two cell pitches or wider. When the width of the peripheral area to be plugged reaches four cell pitches, the rate of rise in pressure loss increases further, exceeding 40%.

As for the fracture, it is possible to reduce the depth of fracture by plugging the peripheral area corresponding to a width of one cell pitch, compared to that not being plugged. Moreover, it is possible to further reduce the depth of fracture by plugging the peripheral area corresponding to a width of two cell pitches.

From these results, it is found that the width of the peripheral area to be plugged needs to be one to three cell pitches and, preferably, one to two cell pitches.

(Eighth Embodiment)

Figure 19:
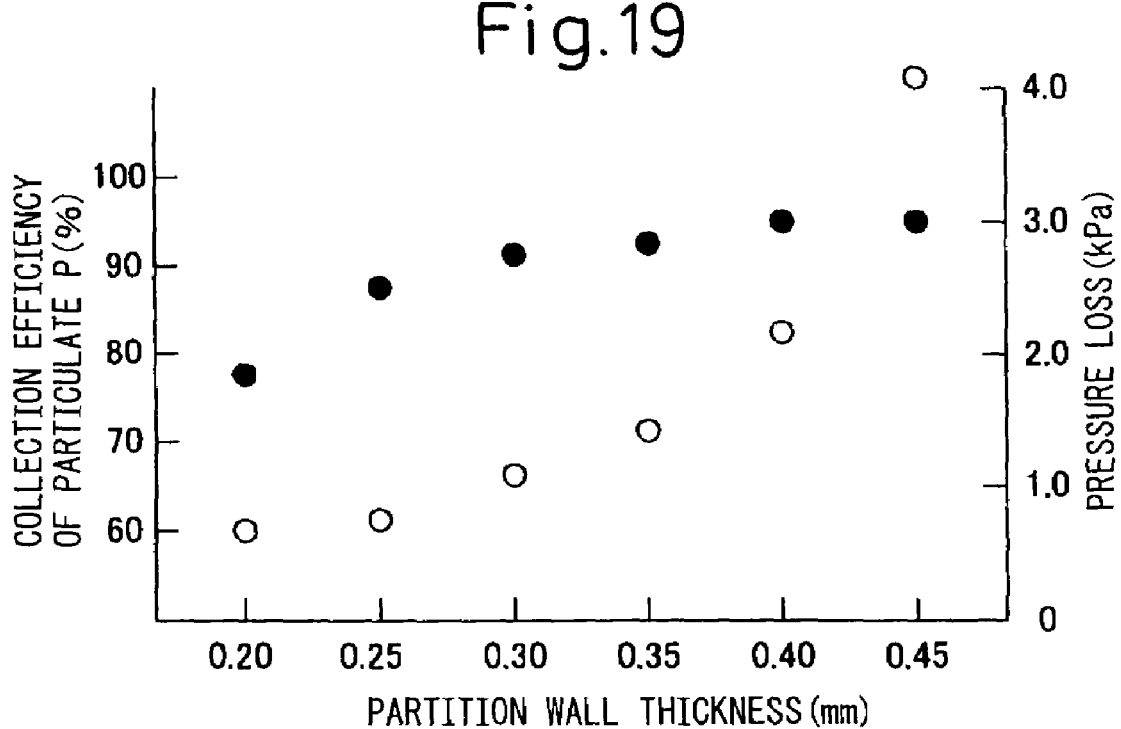
FIG. 19 is a graph that shows the measurement results in the eighth embodiment.

In the present embodiment, as shown in FIG. 19, a relationship between the thickness of the partition wall of the ceramic honeycomb structure and the collection efficiency of particulates in an exhaust gas, and between that and the pressure loss, is assessed.

In other words, an exhaust gas containing particulates flows through each exhaust gas purifying filter at a rate of 2 m³/min. Then, the mass M1 of the exhaust gas purifying filter before the exhaust gas flows, and the mass M2 of that after the exhaust gas flows are measured respectively and, at the same time, the mass N of the particulates that have passed through the exhaust gas purifying filter is measured. Based on the mass M1, M2 and N, the collection efficiency P of particulates is calculated from the formula:

$$P=(M2-M1)/(M2-M1+N)$$

In FIG. 19, the collection efficiency is denoted by black circles and the pressure Loss is denoted by white circles.

As shown in FIG. 19, it is possible to sufficiently increase the collection efficiency by setting the thickness of the partition wall to 0.25 mm or more. However, if the thickness of the partition wall exceeds 0.40 mm, the pressure loss increases extremely.

From these results, it is found that the thickness of the partition wall is preferably 0.25 to 0.40 mm.

While the invention has been described by reference to specific embodiments chosen for the purposes of illustration, it should be apparent that numerous modifications could be made thereto by those skilled in the art without departing from the basic concept and scope of the invention.

The invention claimed is:

1. An exhaust gas purifying filter comprising:
   a ceramic honeycomb structure having a surrounding wall, partition walls provided in a honeycomb pattern within the surrounding wall, and a plurality of cells partitioned by the partition walls and, at the same time, penetrating through from one end face of the ceramic honeycomb structure to the other;
   wherein if a virtual line is drawn on the both end faces of the ceramic honeycomb structure by continuously connecting points at a distance of 3.0 times the pitch of the cells in the direction toward the center from the inner surface of the surrounding wall, not less than 90% of the peripheral area outside the virtual line is blocked with plug material, and
   wherein the surrounding wall and the partition walls have a porosity of not less than 50%.

2. An exhaust gas purifying filter, as set forth in claim 1, wherein a partial area or the whole area of the opening of each cell through which the virtual line passes is blocked with the plug material.

3. An exhaust gas purifying filter, as set forth in claim 1, wherein the surrounding wall has a thickness of 0.2 to 0.8 mm.

4. An exhaust gas purifying filter, as set forth in claim 1, wherein the ceramic honeycomb structure is made of cordierite.

5. An exhaust gas purifying filter, as set forth in claim 1:
   wherein the exhaust gas purifying filter is one for a diesel engine for purifying an exhaust gas discharged from the diesel engine; and wherein in the central area within the virtual line on the end face of the ceramic honeycomb structure, both openings of the cells provided with plug material and openings of the cells not provided with plug material exist mixedly in such a way that they are arranged alternately.

6. An exhaust gas purifying filter, as set forth in claim 1, wherein the virtual line is a line drawn by continuously connecting points at a distance of 1.0 to 2.0 times the pitch of the cells in the direction toward the center from the inner surface of the surrounding wall.

7. An exhaust gas purifying filter, as set forth in claim 1, wherein the partition wall has a thickness of 0.25 to 0.40 mm.

* * * * *